US009523594B1

(12) United States Patent
Gordon et al.

(10) Patent No.: US 9,523,594 B1
(45) Date of Patent: Dec. 20, 2016

(54) POWER CONTROL FOR AN AIR DATA PROBE (71) Applicant: Honeywell International Inc., Morris Plains, NJ (US)

(72) Inventors: Grant A. Gordon, Peoria, AZ (US); Danny Thomas Kimmel, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/051,493

(22) Filed: Feb. 23, 2016

(51) Int. Cl.
G01F 1/48 (2006.01)
G01F 1/46 (2006.01)

(52) U.S. Cl.
CPC ........................................ G01F 1/46 (2013.01)

(58) Field of Classification Search
USPC .................... 73/861.68, 178 R; 219/203, 201
See application file for complete search history.

(56) References Cited

U.S. PATENT DOCUMENTS

| 4,458,137 A | 7/1984 | Kirkpatrick |
| 4,506,137 A | 3/1985 | Meister |
| 5,929,568 A | 7/1999 | Eggers |
| 6,048,094 A * | 4/2000 | Tornare ............. G01K 7/25 307/116 |
| 6,070,475 A | 6/2000 | Muehlhauser et al. |
| 6,250,802 B1 * | 6/2001 | Dotan ............. G01K 7/42 374/164 |
| 6,971,790 B2 * | 12/2005 | Quinn ............. G01K 15/005 374/1 |
| 7,059,767 B2 * | 6/2006 | Tokita ............. G01K 7/42 374/135 |
| 8,794,829 B2 * | 8/2014 | Meyerson ............. G01K 1/02 374/163 |
| 2014/0245830 A1 | 9/2014 | Martin et al. |

* cited by examiner

Primary Examiner — Jewel V Thompson
(74) Attorney, Agent, or Firm — Fogg & Powers LLC (57) ABSTRACT A control circuit for a probe includes: at least one low thermal coefficient resistance (TCR) component placed in a first section of a probe, wherein the at least one low TCR component has low positive temperature resistance coefficient (PTC); at least one high TCR component placed in a second section of the probe and connected in series with the at least one low TCR component, wherein the at least one high TCR component has high PTC, and wherein the at least one high TCR component responds to temperature differently than the at least one low TCR component; and at least one shunt component connected in parallel with the at least one high TCR component, wherein when temperature of the at least one high TCR component exceeds a set temperature point, the at least one shunt component is activated to reduce current flowing through the at least one high TCR component.

20 Claims, 8 Drawing Sheets

POWER CONTROL FOR AN AIR DATA PROBE

BACKGROUND

Many air data probes measure fluid flow velocity. Air data probes including pitot and pitot static probes are used to determine an aircraft's airspeed. The tips of these air data probes may include an inlet hole used for measurement of pressure.

SUMMARY

A control circuit for a probe comprises: at least one low temperature coefficient of resistance component placed in at least a first section of a probe, wherein the at least one low temperature coefficient of resistance component has a low positive temperature resistance coefficient; at least one high temperature coefficient of resistance component placed in at least a second section of the probe and connected in series with the at least one low temperature coefficient of resistance component, wherein the at least one high temperature coefficient of resistance component has a high positive temperature resistance coefficient, and wherein the at least one high temperature coefficient of resistance component responds to temperature differently than the at least one low temperature coefficient of resistance component; and at least one shunt component connected in parallel with the at least one high temperature coefficient of resistance component, wherein when the temperature of the at least one high temperature coefficient of resistance component exceeds a set temperature point, the at least one shunt component is activated to reduce the current flowing through the at least one high temperature coefficient of resistance component.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In some systems, an air data probe is used to facilitate the determination of the airspeed of an aircraft. In some examples, the air data probe can include a pitot tube or a pitot static tube. To determine the fluid flow velocity, a tube is placed into a fluid such that an inlet hole of the probe points into the flowing fluid. This fluid can be a media such as air or liquid. The pitot tube delivers pressure pneumatically to a pressure sensor that measures the pressure due to the dynamic pressure loading at the inlet hole. In exemplary embodiments, pitot tubes have heating elements to prevent the tube from becoming clogged with ice. One of the critical requirements of the probe is the ability to generate heat to de-ice and maintain ice-free condition while operating in adverse weather conditions.

Some sections of the probe (such as a tip of a pitot probe) often require significantly more power density to meet icing requirements than other sections (such as a strut) of the probe. For example, some air data probes require a larger amount of heat to meet icing requirements in the critical tip area. In the embodiments described herein, these sections are referred to as critical sections and/or high heat demand areas. To meet the de-icing and anti-icing requirements stipulated by the regulatory agencies, different amounts of heat needs to be provided to various section(s) of the probe. However, when only limited cooling is present the heat generated in the high heat regions of the probe is not dissipated and the probe will become extremely hot with heat generated in excess of the power needed to keep the probe ice free. This can be detrimental to long term life of the heater cable.

In some situations, the air data probes need to operate at full power to meet anti-icing and de-icing requirements. Continuous operation of the air data probe at full power for a stationary aircraft, on ground, during a hot day, however, can result in premature failure of the probe. The high levels of heat generated compromise the heater wire and braze of the probe resulting in significantly reduced lifetimes of the probe and decreased mean time between failure (MTBF).

Some conventional systems control the amount of power provided to the probe depending on the conditions surrounding the aircraft. For example, when the aircraft is on the ground, the amount of power applied is reduced from the amount of power applied when the aircraft is in air. These conventional systems externally control the amount of power to the probe heaters based on items such as the aircraft operational state, ambient conditions, or through the sensing/reporting the temperature of the probe.

In exemplary embodiments, a simple control circuit is shown that provides self-regulating power. The power provided to the probe does not have to be modified using external means. Rather, as described in the embodiments herein, the power in the heater cable servicing the high heat demand areas of the probe, such as the tip, is controlled using a simple control strategy that shunts current going to probe when the tip reaches a predetermined temperature. The power control strategy described in the embodiments herein is considered to be simple because a comprehensive combination of deterministic tests and analysis appropriate to the design assurance level can ensure correct functional performance under all foreseeable operating conditions with no anomalous behavior.

In exemplary embodiments, the simple power control strategy is achieved by fabricating a heater circuit with at least two resistance components. In exemplary embodiments, the at least two resistance components include at least one high temperature coefficient of resistance (TCR) component and at least one low temperature coefficient of resistance (TCR) component. In exemplary embodiments, at least one of the high TCR resistance component and the at least one of the low TCR component is a resistive heater. In exemplary embodiments, one or more of the at least two resistance components are comprised of positive temperature coefficient (PTC) resistance heaters. In exemplary embodiments, the resistance of the heaters have a monotonically increasing relationship with the temperature of the heating element. In further examples, the resistance of the heaters have a linearly increasing relationship with the temperature of the heating elements.

In exemplary embodiments, the at least one high TCR resistance component is connected in series with the at least one low TCR resistance component. In exemplary embodiments, the low TCR resistance component is placed in at least a first section of the air data probe and the at least one high TCR resistance component is placed in at least a second section of the air data probe, wherein at least a second section is a critical section of the air data probe and the power control strategy described herein is used to shunt the current going through a desired path in the critical section when the temperature along that path reaches a predetermined temperature threshold. In exemplary embodiments, the high TCR resistance component is a heating element or section of the heater cable of the probe. In exemplary embodiments, the low TCR section component is a heating element or section of the heater cable of the probe. Connected in series, these elements act as temperature sensitive voltage divider that control the amount of current drawn by the PTC heater in the critical section(s) of the probe (such as the tip).

In the embodiments described herein, the current is provided with an alternative path to flow through when the temperature of the heater in the high TCR component reaches a defined temperature. At the defined temperature, additional power for anti-icing and de-icing functions is not required and the current drawn by the heater in the high TCR component can be limited. The embodiments described herein, provide a controlled approach to shunt at least some of the current flowing through the heater in the high TCR component areas when it reaches the defined temperature using a shunt component. The shunt component is connected in parallel with the high TCR component heaters that provides heat to the high power demand regions of the probe such as the probe tip. As the high power demand regions of the probe heat up, the voltage drop across high TCR resistance component and the voltage seen across the shunt component increases as well. When the voltage seen across the shunt component exceeds a set voltage point, the shunt component is activated and diverts at least some current thereby limiting the current conducted through high heat demand sections of the probe. The shunt component comprises at least one of diodes, thermistor, Zener diodes, Schottky diodes, resistors, thyristors, (for example, triode for alternating current (TRIAC), diode for alternating current (DIAC), etc), capacitors or other such components either alone or in combination such that the shunt component is activated at a set voltage point at a set temperature. In exemplary embodiments, the controlled approach uses a passive power control circuit to shunt current going to probe when the tip reaches a predetermined temperature.

Figure 1:
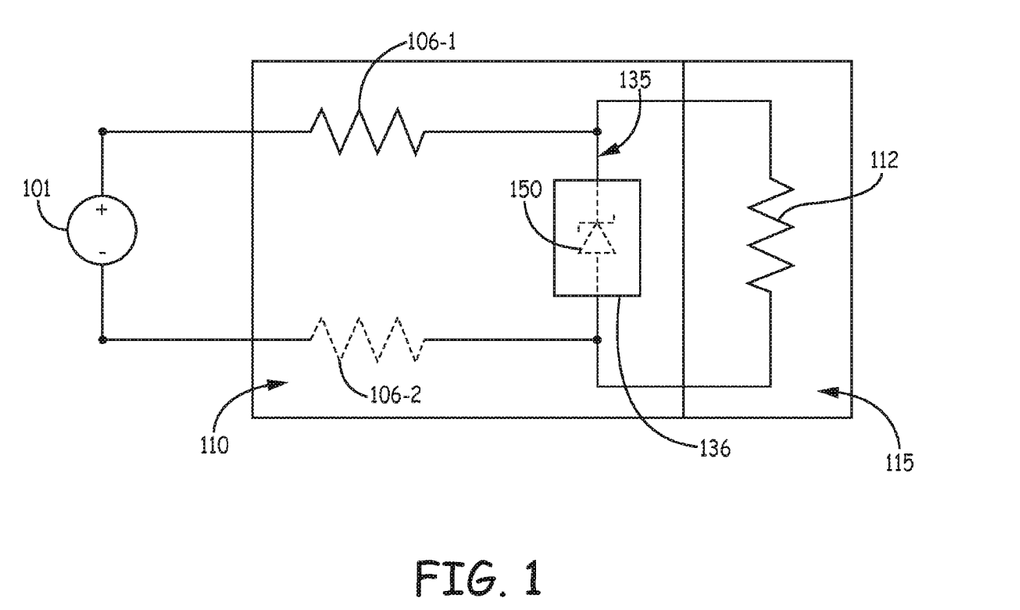
FIG. 1 is an example of a heater cable circuit included in a probe according to one embodiment of the present disclosure.

FIG. 1 shows one example of a heater cable circuit 100 of a probe as implemented in embodiments described herein. The heater cable circuit 100 includes a voltage source 101, which is connected to at least one resistor with a low TCR 106 that is positioned along first section 110 of the probe and at least one high TCR resistance component 112 that is placed a second section 115 of the probe. The second section 115 is a high heat demand section of the probe. In exemplary embodiments, the first section 110 of the probe is a strut of the probe. In exemplary embodiments, the second section 115 is a tip of the probe. In exemplary embodiments, at least one low TCR resistance component 106 functions as a low PTC resistor. In some examples, low TCR resistance component 106 functions as a fixed resistor that does not change value. In exemplary embodiments, component 112 a temperature dependent resistive component that changes resistance based on the temperature across the resistive component. In a further example, the temperature dependent resistive component is a positive temperature resistance coefficient (PTC) resistor or a resistor in series with a PTC thermistor. In the example shown in FIG. 1, a voltage source 101 is connected with low TCR component 106 and a high TCR component 112. In exemplary embodiments, the heater cable circuit includes multiple low TCR resistance components 106 connected to the voltage source 101 and high TCR resistance component 112. Low TCR resistance component 106 and high TCR high TCR resistance component 112 are connected in series with each other.

In the example shown in FIG. 1, at least one shunt component 136 is connected with the high TCR resistance component 112 in parallel. In one example, the shunt component 136 includes at least one Zener diode 150. In exemplary embodiments, the Zener diode 150 is implemented in a reverse bias configuration. Thus, the voltage drop seen across the high TCR component is matched with the voltage seen across the shunt component 136. As the probe heats up, the temperature of the high TCR component increases as well resulting in an increase in the voltage drop across the high TCR component 112. Accordingly, the voltage seen across the shunt component 136 increases as well. When the voltage seen across shunt component 136 exceeds a set voltage point (for example, the breakdown voltage of the Zener diode 150 in embodiments including a Zener diode 150 as part of the shunt component 136), the shunt leg 135 of the circuit, which is parallel to high TCR resistance component 112 and includes shunt component 136, acts as a shunt. The shunt component 136 allows the current to be conducted through it after exceeding the set voltage point thereby limiting the current conducted through the high TCR resistance component 112. In exemplary embodiments, the voltage across the high TCR component 112 exceeds the set voltage point at a set temperature point.

Some current is constantly flowing through the low TCR component 106. The amount of current flowing through the low TCR component 106 is dependent on whether the voltage drop across the high TCR component 112 has exceeded the set voltage point. For example, in the embodiment of FIG. 1, the current flowing through low temperature coefficient of resistance component(s) 106 is approximately equal to the current flowing through the high TCR resistance component high TCR resistance component 112 until the voltage drop across the high TCR resistance component 112 reaches the set voltage point. At the set voltage point, the shunt component 136 is activated to allow current to conduct through shunt leg 135. Accordingly, once the voltage drop across the high TCR resistance component 112 exceeds the set voltage point, the current flowing through the low TCR component(s) 106 is greater than the current flowing through high TCR resistance component 112. Thus, past the set voltage point, the low TCR resistance component resistance component(s) 106 heats up while the high TCR resistance component 112 cools down. In exemplary embodiments, the shunt component 136 is configured to have a set voltage point value such that reduced current is conducted through the high TCR resistance component 112 and the high TCR resistance component 112 is allowed to cool down.

Figure 2A:
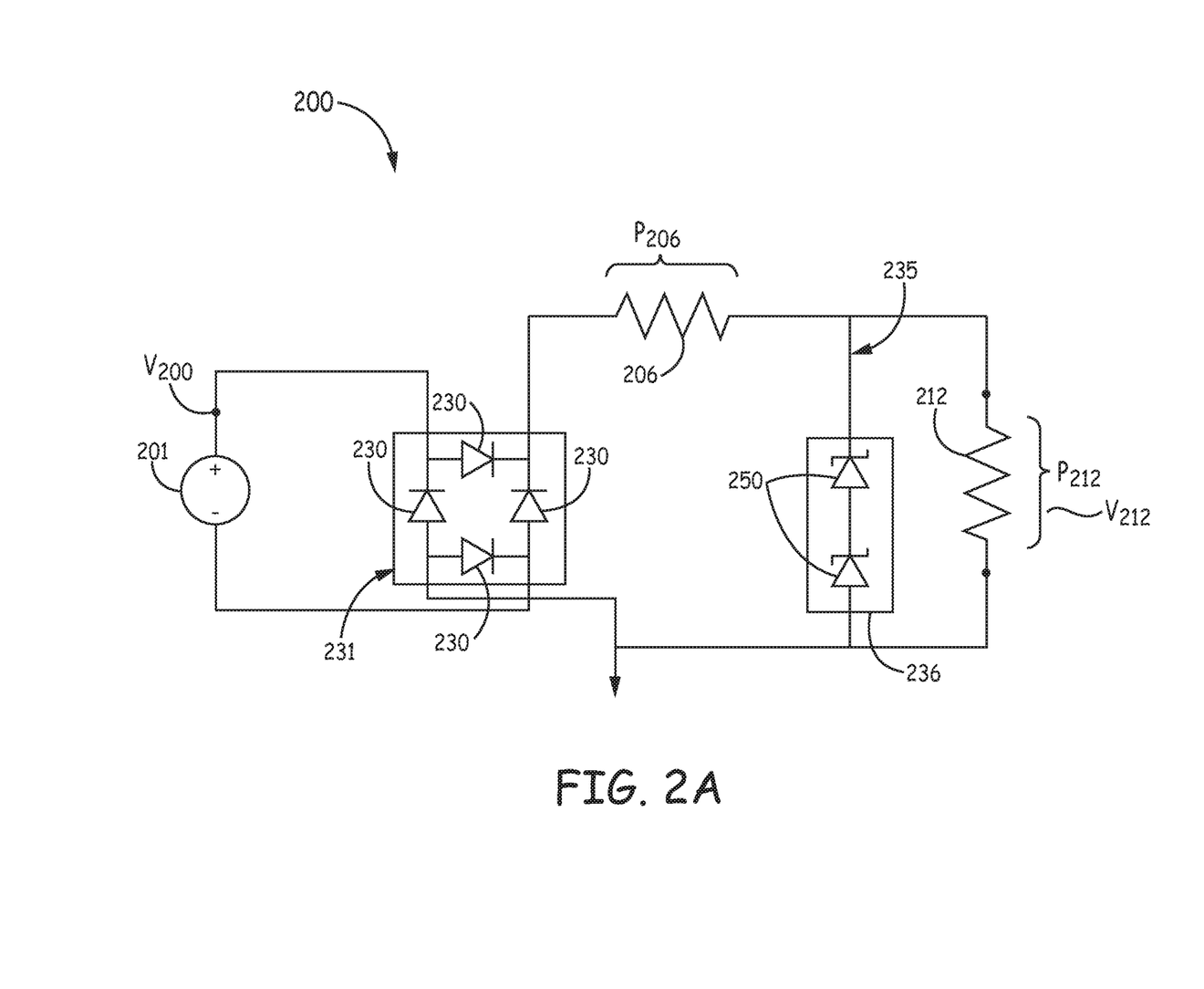
FIG. 2A is yet another example of a heater cable circuit included in a probe according to one embodiment of the present disclosure.
Figure 2B:
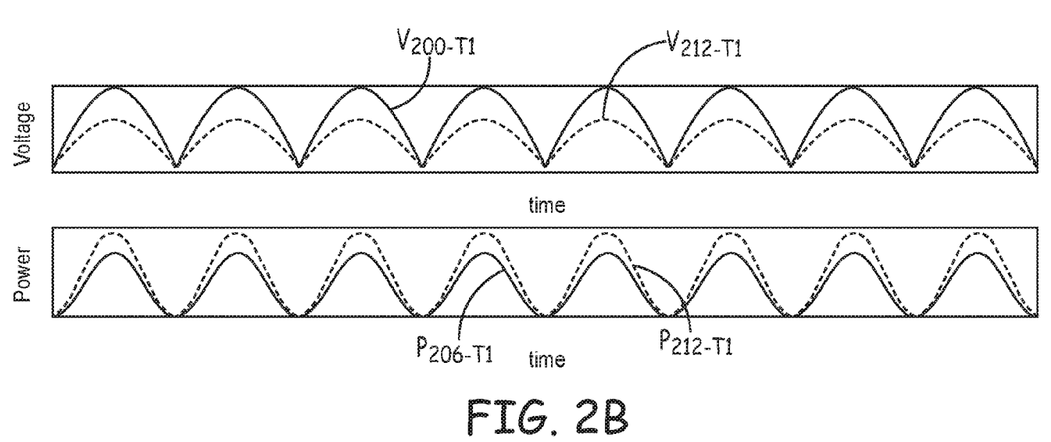
FIGS. 2B and 2C are graphical representations of voltage and power at various points in the example of the heater cable circuit of FIG. 2A in cold configuration and a hot configuration respectively.
Figure 2C:
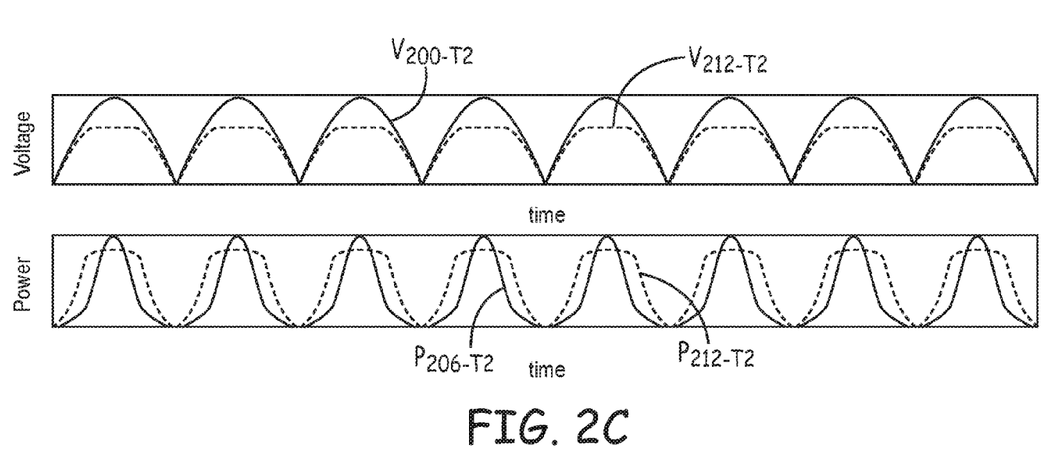

FIGS. 2A-2C describe exemplary embodiments of a heater cable circuit 200 of a probe as implemented in embodiments described herein. The leg 235 of the shunt component 236 in heater cable circuit 200 is connected in parallel with temperature dependent high TCR resistance component 212, and connected in series with at least one low TCR resistance component 206. As shown in FIG. 2A-2C, the heater cable circuit 200 includes a voltage source 201. In exemplary embodiments, such as shown in FIGS. 2A-2C, the voltage source 201 is an AC power supply (such as an AC power supply on an aircraft). In such an embodiment, a wave rectification circuit 231 is included in the heater cable circuit to convert the AC power to DC. In the examples shown in FIG. 2A-2C, the wave rectification circuit 231 is a full wave rectification circuit. In other examples, the wave rectification circuit 231 may be a half wave rectification circuit or any other wave rectification circuit. In exemplary embodiments, the wave rectification circuit 231 includes four diodes 230 arranged in a bridge circuit configuration. The operation of a wave rectification circuit 231 having four diodes 230 arranged in a bridge configuration for conversion of an AC input into a DC output is known in the art.

Heater cable circuit 200 further includes at least one low TCR resistance component 206 that is positioned along a first section (such as the strut) of the probe and at least one high TCR resistance component 212 that is placed around a second section (such as the tip) of the probe. In exemplary embodiments, the low TCR resistance component 206 has a low PTC. In exemplary embodiments, the low TCR resistance component 206 functions as a fixed resistor that does not change value. In exemplary embodiments, the high TCR component 212 is a temperature dependent resistance component that changes resistance based on the temperature across the dependent resistance component and has a high PTC. In exemplary embodiments, at least one of the low TCR resistance component 206 and the high TCR component 212 functions as a PTC resistor. Low TCR resistance component 206 and high TCR component 212 are connected in series. In exemplary embodiments, a resistance value of the high TCR component 212 is dependent on changes in temperature in the second section of the probe that includes the high TCR component 212.

Heater cable circuit 200 further includes a shunt component 236. In exemplary embodiments, the shunt component 236 includes at least two Zener diodes 250 connected in series with each other. In exemplary embodiments, Zener diodes 250 are implemented in a reverse bias configuration. In the example shown in FIGS. 2A-2C, leg of the shunt component 236 is connected in parallel with high TCR component 212. Thus, the voltage drop seen across high TCR component 212 is matched with the voltage seen across the shunt component 236.

FIG. 2B is graphical representation of voltage across and power at various points in heater cable circuit 200 of the example shown in FIG. 2A in a cold configuration. The example in FIG. 2B shows voltage and power at a first temperature T1 before the voltage $V_{212}$ across high TCR component 212 exceeds a set voltage point. The voltage at $V_{200\text{-}T1}$ is the voltage measured at point $V_{200}$ before it has passed through low TCR resistance component 206.

Some current is constantly flowing through the low TCR resistance component 206. The amount of current flowing through the low TCR resistance component 206 is dependent on whether the voltage drop across the high TCR resistance component 212 has exceeded the set voltage point. At the set voltage point, the shunt component 236 is activated to allow current to conduct through shunt leg 235 as well as through component 212. Accordingly, once the voltage drop across the high TCR resistance component 212 exceeds the set voltage point, the current flowing through the low TCR resistance component 206 increased and the current flowing through high TCR resistance component 212 is reduced. Thus, the low TCR resistance component 206 generates more heat while the high TCR resistance component 212 generates less heat. In exemplary embodiments, the voltage across the high TCR component 212 exceeds the set voltage point at a set temperature point.

As the critical section of the probe heats up, the voltage drop across high TCR resistance component 212 increases. Accordingly, the voltage seen across the shunt component 236 increases as well. When the voltage seen across shunt component 236 exceeds a set voltage point (ex. breakdown voltage), the shunt leg 235 of the circuit, which is parallel to high TCR resistance component 212 and includes shunt component 236, acts as a shunt. In the examples shown in FIGS. 2A-2C, the shunt component 236 includes two Zener diodes 250 connected in series with each other. Accordingly, the set voltage point in the examples shown in FIGS. 2A-2C is twice the breakdown voltage of a single Zener diode. The shunt component 236 allows the current to be conducted through it after exceeding the set voltage point thereby limiting the current conducted through the high TCR resistance component 212. One such example embodiment of a hot configuration in heater cable circuit 200 is described by FIG. 2C.

FIG. 2C is graphical representation of voltage across and power at various points in heater cable circuit 200 of the example shown in FIG. 2C in a hot configuration at temperature T2. In the example shown in FIG. 2C, the voltage $V_{212}$ seen across high TCR component 212 has exceeded the set voltage point, and shunt leg 235 has been activated. As seen in FIG. 2C, at temperature T2 after the voltage $V_{212\text{-}T2}$ across high TCR component 212 has exceeded the set voltage point, the power at $P_{212\text{-}T2}$ across the high TCR resistance component 212 decreased in comparison to the power $P_{212\text{-}T1}$ at the first temperature T1 in a cold configuration. The power $P_{206\text{-}T2}$ across low TCR resistance component 206 at temperature T2 in a hot configuration has increased in comparison to power $P_{206\text{-}T1}$ across low TCR resistance component 206 at temperature T1 in a cold configuration.

Figure 3A:
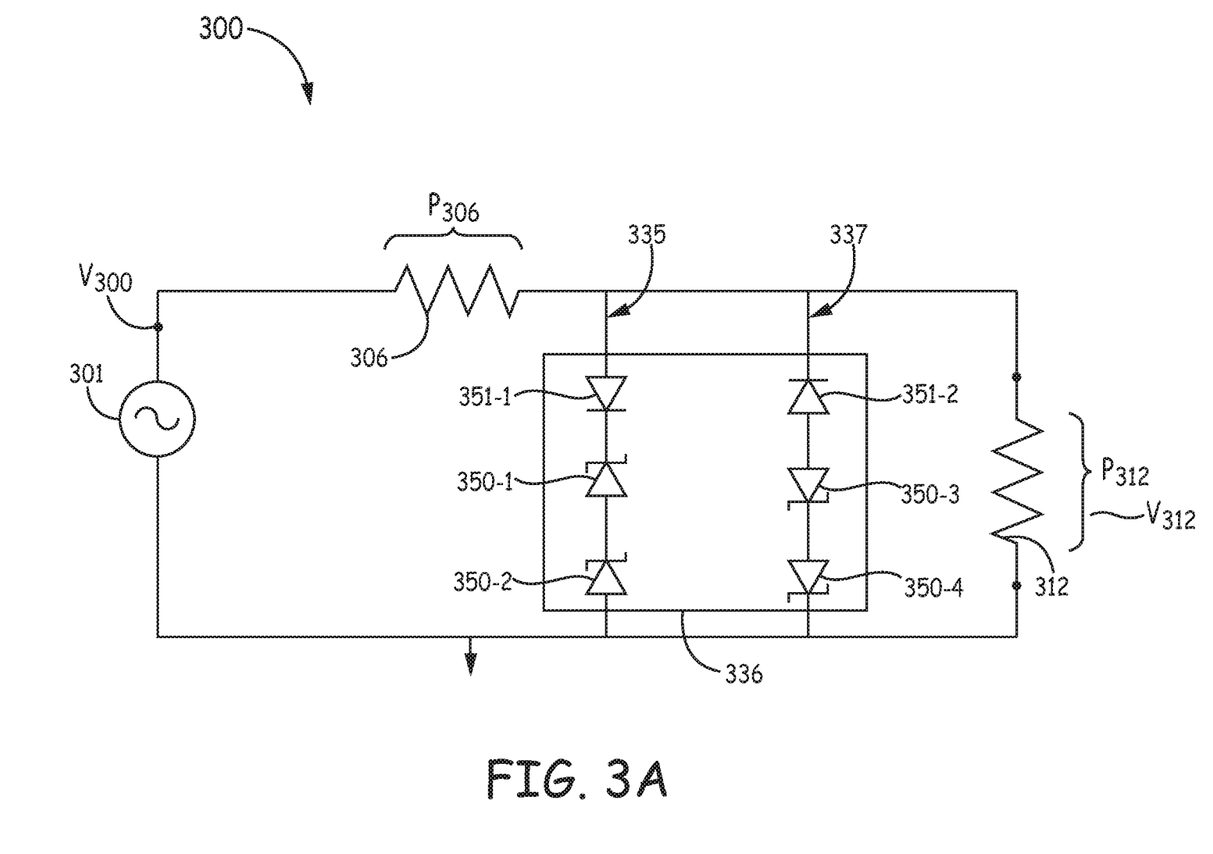
FIG. 3A is another example of a heater cable circuit included in a probe according to one embodiment of the present disclosure.
Figure 3B:
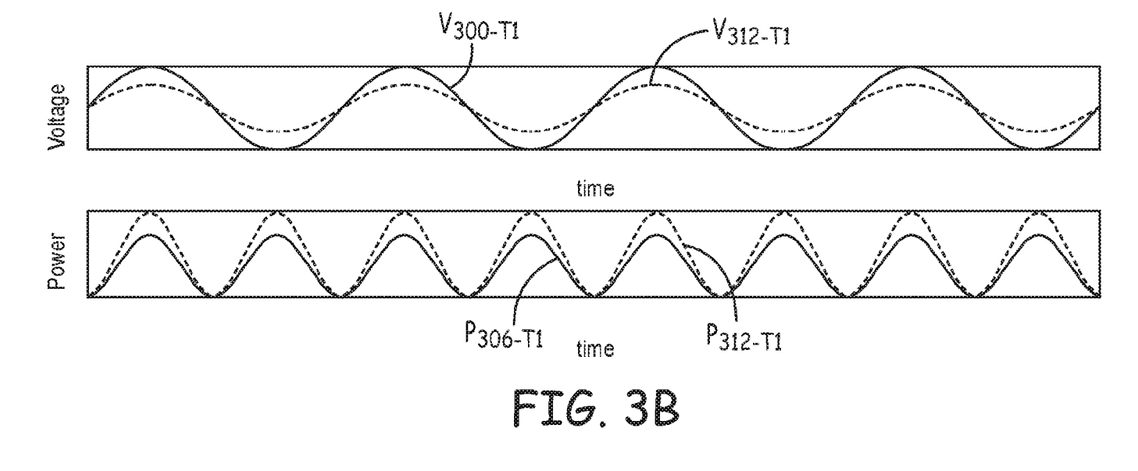
FIGS. 3B and 3C are graphical representations of voltage and power at various points in the example of the heater cable circuit of FIG. 3A in cold configuration and a hot configuration respectively.
Figure 3C:
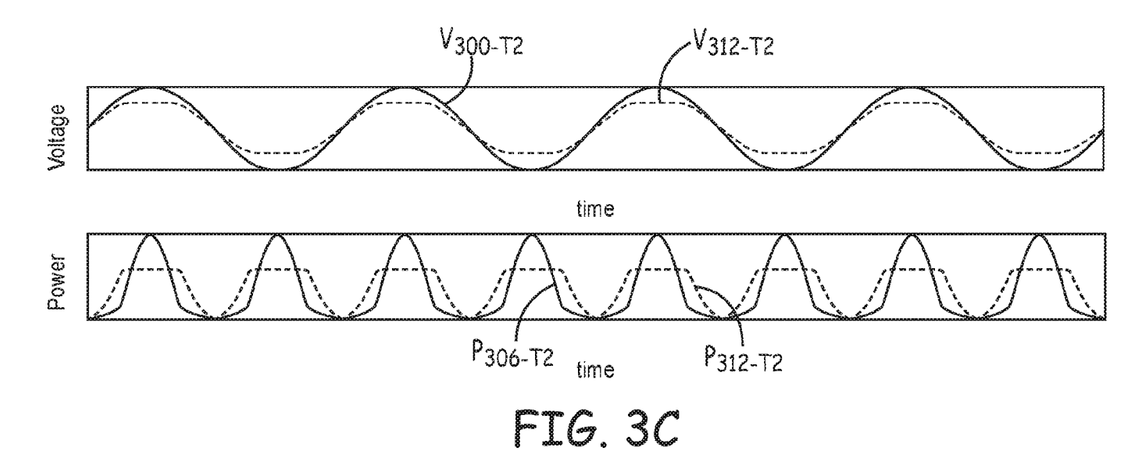

FIGS. 3A-3C describe exemplary embodiments of a heater cable circuit 300 of a probe as implemented in embodiments described herein. As shown in FIG. 3A-3C, the heater cable circuit 300 includes a voltage source 301. In exemplary embodiments, such as the ones shown in FIGS. 3A-3C, the voltage source 301 is an alternating current (AC) power supply.

Heater cable circuit 300 further includes at least one low TCR resistance component 306 that is positioned along a first section (such as the strut) of the probe and at least one high TCR resistance component 312 that is placed in a second section (such as the tip) of the probe. In exemplary embodiments, the low TCR resistance component 306 functions as a temperature dependent resistor and has a low PTC. In exemplary embodiments, the low TCR resistance component 306 functions as a fixed resistor that does not change value. In exemplary embodiments, the high TCR component 312 is a temperature dependent resistance component that changes resistance based on the temperature across the resistance component. In exemplary embodiments, at least one of the high TCR component 312 and the low TCR resistance component 306 functions as a PTC resistor. Low TCR resistance component 306 and high TCR component 312 are connected in series. The resistance value of high TCR resistance component 312 is dependent on changes in temperature in the critical section(s) of the probe.

Heater cable circuit 300 further includes a shunt component 336. In exemplary embodiments, the shunt component 336 includes at least one of a Zener diode and a Schottky diode. In the example shown in FIGS. 3B and 3C, leg 335 of the circuit is connected in parallel with high TCR component 312. In one example, leg 335 includes two Zener diodes 350-1 and 350-2 that are connected in series with each other in a reverse bias configuration. In a further example, a diode 351-1 is also connected in series with 350-1 and 350-2 as shown in FIGS. 3A and 3C to ensure that the Zener diodes are shunting current only when the voltage seen across high TCR resistance component 312 exceeds the breakdown voltage.

In one example, shunt component 336 comprises leg 337 that includes at least two Zener diodes 350-3 and 350-4 connected in series with each other. In one example, Zener diodes 350-3 and 350-4 are implemented in a forward bias configuration. In a further example, leg 337 includes a diode 351-2 that is connected in series with Zener diodes 350-3 and 350-4. In the example shown in FIGS. 3A-3C, the voltage drop seen across the high TCR component 312 is matched with the voltage across legs 335 and 337 of shunt component 336. If the voltage drop seen across high TCR resistance component 312 exceeds the breakdown voltage across legs 335 and 337, the current is shunted.

Some current is constantly flowing through the low TCR resistance component 306. The amount of current flowing through the low TCR resistance component 306 is dependent on whether the voltage drop across the high TCR resistance component 312 has exceeded the set voltage point. For example, in the example shown in FIG. 3A, the current flowing through low TCR resistance component 306 is approximately equal to the current flowing through the high TCR resistance component 312 until the voltage drop across the high TCR resistance component 312 reaches a set voltage point. At the set voltage point, the shunt component 336 is activated to allow current to conduct through shunt leg 335 and/or 337. Accordingly, when the voltage drop across the high TCR resistance component 312 exceeds the set voltage point, shunt legs 335 and/or 337, parallel to high TCR resistance component 312 act as a shunt. The shunt component 336 allows the current to be conducted through it after exceeding the set voltage point thereby limiting the current conducted through the high TCR resistance component 312. In exemplary embodiments, the current flowing through the low TCR resistance component 306 is greater than the current flowing through high TCR resistance component 312, and thus, past the set voltage point, the low TCR resistance component 306 heats up while the high TCR resistance component 312 cools down. In exemplary embodiments, the voltage across the high TCR component 312 exceeds the set voltage point at a set temperature point.

FIG. 3B is graphical representation of voltage across and power at various points in heater cable circuit 300 of the example shown in FIG. 3A in a cold configuration at a first temperature T1. The voltage at $V_{300\text{-}T1}$ represents the current before it has passed through low TCR resistance component 306. As seen in the graphical representation in FIG. 3B, voltage $V_{312\text{-}T1}$ represents voltage across high TCR component 312 at temperature T1, power $P_{312\text{-}T1}$ represents power across the high TCR resistance component 312 at temperature T1, and power $P_{306\text{-}T1}$ represents power across low TCR resistance component 306 at temperature T1. In the example shown in FIG. 3B, the power $P_{312\text{-}T1}$ across high TCR component 312 is greater than power $P_{306\text{-}T1}$ across low TCR resistance component 306.

As the critical section(s) heats up, the voltage drop across high TCR resistance component 312 increases. One example embodiment of a hot configuration in heater cable circuit 300 is described by FIG. 3C. FIG. 3C is graphical representation of voltage across and power at various points in heater cable circuit 300 of the example shown in FIG. 3C in a hot configuration at temperature T2, where T2 is above the set point temperature. As seen in FIG. 3C, when the voltage across high TCR component 312 exceeds a set voltage point, the shunt legs 335 and 337 conduct current, and the power at $P_{312\text{-}T2}$ across the high TCR component 312 at temperature T2 has decreased in comparison to the power at $P_{312\text{-}T1}$ across high TCR resistance component 312 at temperature T1. Further, because the current flowing through the circuit has split between the high TCR component 312 and leg 335, the power $P_{312\text{-}T2}$ across high TCR component 312 is less than power $P_{306\text{-}T2}$ across low TCR resistance component 306 at temperature T2.

Figure 4A:
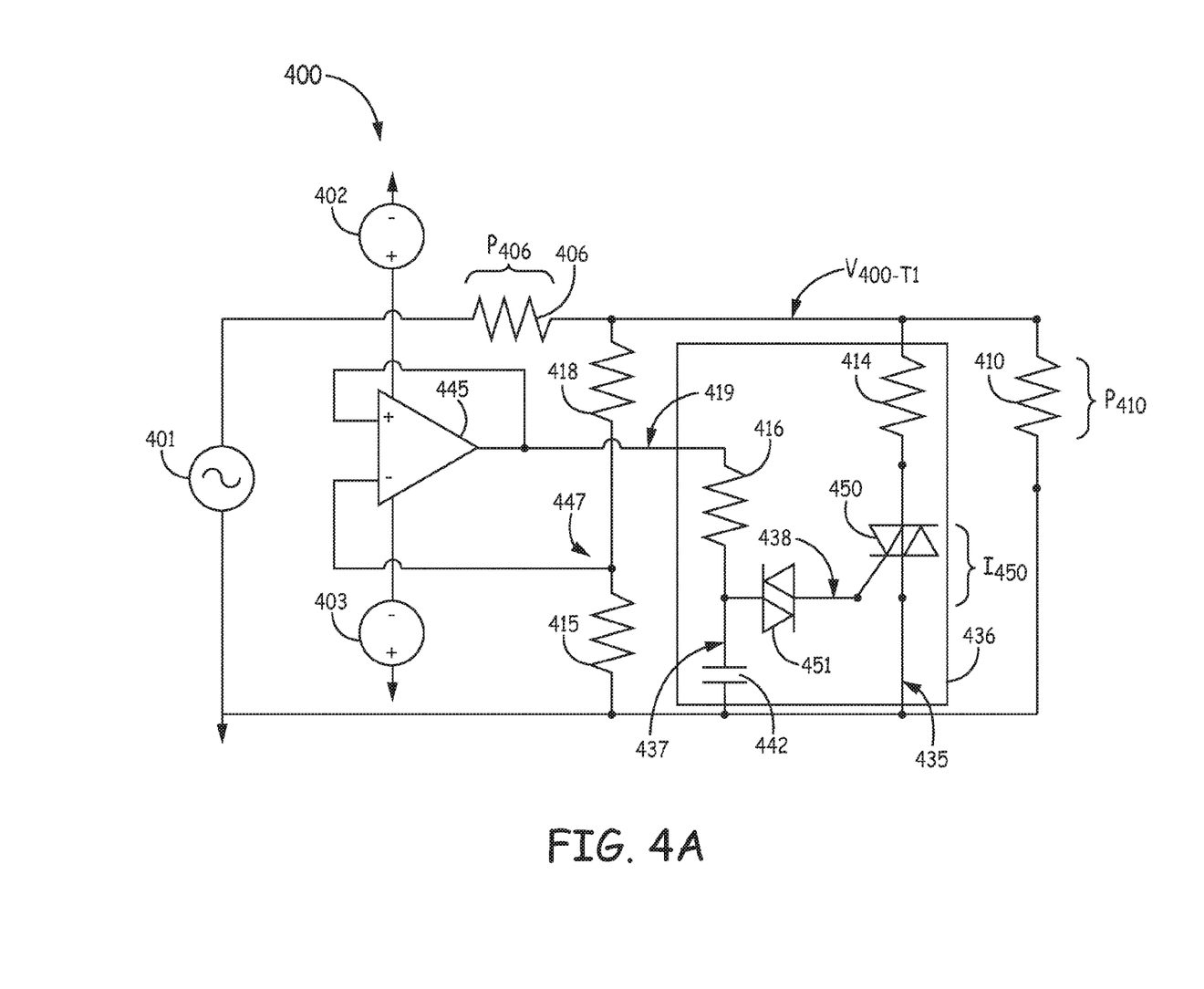
FIG. 4A is another example of a heater cable circuit included in a probe according to one embodiment of the present disclosure.
Figure 4B:
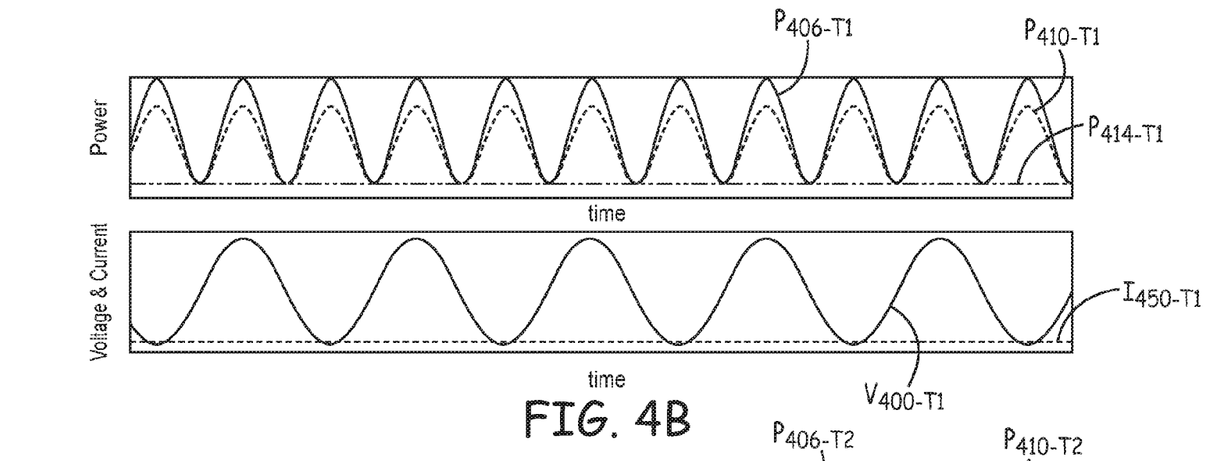
FIGS. 4B and 4C are graphical representations of voltage and power at various points in the example of the heater cable circuit of FIG. 4A in cold configuration and a hot configuration respectively.
Figure 4C:
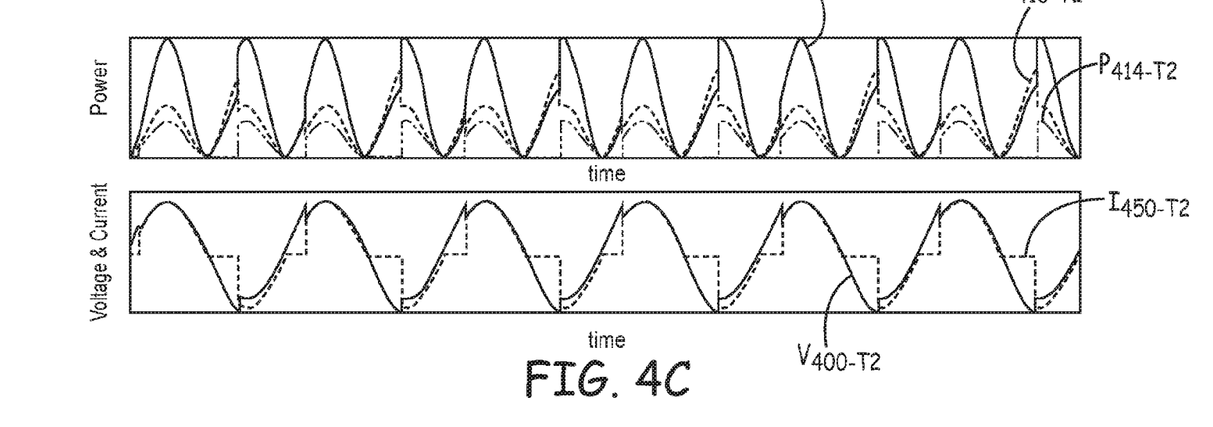

FIGS. 4A-4C describe exemplary embodiments of a heater cable circuit 400 of a probe as implemented in embodiments described herein. As shown in FIG. 4A-4C, the heater cable circuit 400 includes a voltage source 401. In exemplary embodiments, the voltage source 401 is an alternating current (AC) power supply.

Heater cable circuit 400 further includes at least one low TCR resistance component 406 that is positioned along a first section (such as the strut) of the probe and at least one high TCR resistance component 410 that is placed in at least one second section (such as the tip) of the probe. In exemplary embodiments, the low TCR resistance component 406 functions as a resistive heater that has a low PTC. In exemplary embodiments, the low TCR resistance component 406 functions as a fixed resistor that does not change value. In exemplary embodiments, the high TCR component 410 is a resistive heater component that changes resistance based on its temperature and has a high PTC. In exemplary embodiments, at least one of high TCR component 410 and low TCR resistance component 406 functions as a PTC resistor. Low TCR resistance component 406 and high TCR component 410 are connected in series. The resistance value of high TCR resistance component 410 is dependent on changes in temperature in the critical section of the probe.

Heater cable circuit 400 further includes a shunt component 436. In exemplary embodiments, the shunt component is connected in parallel with the high TCR component 410. The shunt component is activated when the voltage seen across the high TCR resistance component 410 exceeds a set voltage point, and shunts the current flowing through high TCR resistance component 410. In exemplary embodiments, the shunt component 436 includes at least one thyristor (ex. triode for alternating current (TRIAC), diode for alternating current (DIAC), etc.). In the examples shown in FIGS. 4A-4C, heater cable circuit includes two thyristors: a first thyristor 450 (a triode for alternating current (TRIAC)), and a second thyristor 451 (a diode for alternating current (DIAC)), which is connected to TRIAC 450. In one example of heater cable circuit 400, TRIAC 450 is connected in series to a resistor 414.

Conventionally, DIACs function like two diodes connected back to back with each other in parallel when latched. They conduct current in a direction as long as voltage is available to push enough current in that direction. Thus, DIAC 451 enables current to be conducted after exceeding a set voltage point. In an AC circuit like the one shown in FIGS. 4A-4C, DIAC 451 will stay latched for half a cycle and conduct current only as long as voltage to push enough current in a desired direction is available.

Conventionally, TRIACs function as two silicon controlled rectifying diodes connected back to back with each other in parallel when latched. TRIACs have two main terminals connecting the diodes in parallel, along with a gate that receives the triggering current. TRIACs conduct current in a pre-determined direction as long as voltage is available to push enough current in the pre-determined direction. In the examples shown in FIGS. 4A-4C, TRIAC 450 is connected to DIAC 451 via gate leg 438. A first terminal of TRIAC 450 is connected to a capacitor 442 and a second terminal of TRIAC 450 is connected in series to low TCR resistance component 406. In exemplary embodiments, TRIAC 450 is connected in series to a resistor 414 along with low TCR resistance component 406. DIAC 451 prevents any gate current until triggering voltage has reached a certain, repeatable level in either direction and provides a symmetrical waveform for current conducted through TRIAC 450.

In one example, the DIAC 451 is connected in parallel to a capacitor 442 and to the TRIAC 450 in series. Capacitor 442 accumulates charge until the voltage across capacitor 442 is the same as the breakdown voltage of DIAC 451. When the voltage across capacitor 442 is the same as the breakdown voltage of DIAC 451, DIAC 451 is triggered to conduct current and allows capacitor 442 to discharge current into the gate of TRIAC 450. In one example, DIAC 451 is also connected to resistor 416 in series, which controls the amount of phase shift on the gate of the TRIAC.

Heater cable circuit 400 can optionally include an operational amplifier (op-amp) 445. In one example, output of op-amp 445 is connected to resistor 416, which is connected to DIAC 451 and a capacitor 442, and the current output from the op-amp 445 flows through resistor 416. Further, in one example, heater cable circuit 400 includes a resistor 418 connected in series with low TCR resistance component 406. In a further example, heater cable circuit 400 also includes a resistor 415 connected in series with a resistor 418. As shown in example 4A, after flowing through resistor 418, the current splits between resistor 415 and the input received by op-amp 445. Accordingly, in such an example, the output of op-amp 445 is dependent on output of op-amp 445 in a previous state and on the current split at node 447 after passing through resistor 418. In one example, op-amp 445 is further connected to power supply pins 402 and 403. These optional elements can affect the voltage seen across high TCR resistance component 410 and current flowing through TRIAC 450.

FIG. 4B is a graphical representation of voltage, current and power at various points in heater cable circuit 400 of the example shown in FIG. 4A in a cold configuration at a first temperature T1. As seen in the graphical representation in FIG. 4B, voltage $V_{400-T1}$ represents voltage across high TCR component 410, power $P_{406-T1}$ represents power across the low TCR resistance component 406, and power $P_{410-T1}$ represents power across the high TCR resistance component 410 at temperature T1. Since the voltage seen across high TCR component 410 has not reached the set voltage point, TRIAC 450 has not been triggered in this configuration, and no current $I_{450-T1}$ is flowing across through TRIAC 450. Subsequently, power $P_{414-T1}$ across resistor 414 is also zero.

Some current is constantly flowing through the low TCR resistance component 406. The amount of current flowing through the low TCR resistance component 406 is dependent on whether the voltage drop across the high TCR resistance component 410 has exceeded the set voltage point. At the set voltage point, the shunt component 436 is activated to allow current to conduct through shunt legs 435, 437 and/or 438. The shunt component 436 allows the current to be conducted through it after exceeding the set voltage point thereby limiting the current conducted through the high TCR resistance component 410. In exemplary embodiments, the current flowing through the low TCR resistance component 406 is greater than the current flowing through high TCR resistance component 410, and thus, past the set voltage point, the low TCR resistance component 406 generated more heats while the high TCR resistance component 410 generates less heat.

As the critical section(s) of the probe heats up, the voltage drop across high TCR resistance component 410 increases. One example embodiment of a hot configuration in heater cable circuit 400 is described by FIG. 4C. FIG. 4C is graphical representation of voltage, current and power at various points in heater cable circuit 400 of the example shown in FIG. 4A in a hot configuration at temperature T2. In this configuration, the voltage seen across high TCR resistance component 410 has exceeded the set voltage point. Thus, as seen in FIG. 4C, at temperature T2, TRIAC 450 comprised in shunt component 436 has been triggered to conduct current $I_{450-T2}$ across TRIAC 450, and power $P_{414-T2}$ across resistor 414 has increased from zero. Further, as seen in FIG. 4C, at temperature T2, peak power $P_{410-T2}$ across high TCR resistance component 410 has decreased in comparison to peak power $P_{410-T1}$ across high TCR component 410 at temperature T1 in a cold configuration, and peak power $P_{406-T2}$ across low TCR resistance component 406 has increased in comparison to peak power $P_{406-T1}$ across low TCR resistance component 406.

Figure 5:
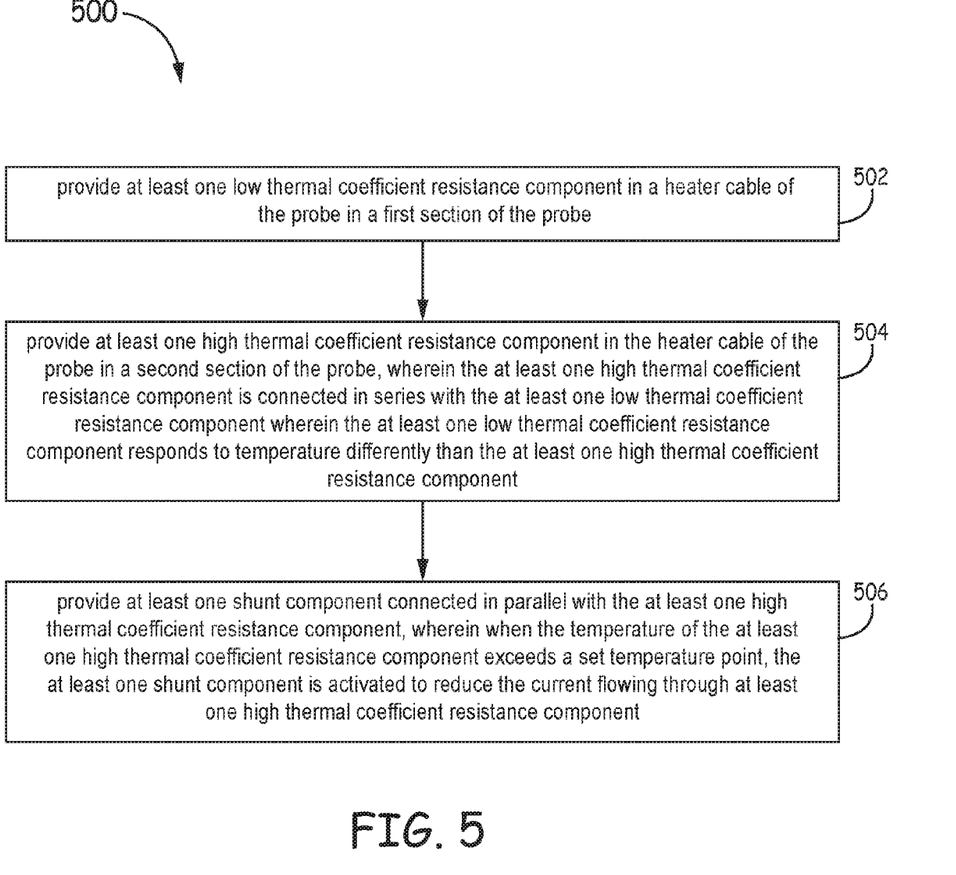
FIG. 5 illustrates an exemplary process of power control in an air data probe according to one embodiment of the present disclosure.

FIG. 5 is a flow diagram showing an exemplary method 500 of manufacturing a power control circuit in a probe. As discussed herein, method 500 is described with respect to examples of probe shown in FIGS. 1 through 4C. However, method 500 may apply to other examples of a probe as well.

Method 500 begins at block 502 with providing at least one low thermal coefficient resistance (TCR) component in a heater cable of a probe in at least a first section of the probe. In one example, the at least one low TCR component can be fabricated using a material composed of nichrome (NiCr). In exemplary embodiments, method 500 further comprises providing a full wave rectification circuit for converting alternating current (AC) power supply to direct current (DC).

Method 500 proceeds to block 504 with providing at least one high TCR component in the heater cable of the probe in at least a second section of the probe, wherein the at least one high TCR component is connected in series with the at least one low TCR component, and wherein the at least one high TCR component responds to temperature differently than the at least one low TCR component. In exemplary embodiments, at least the first section of the probe is a strut of the air data probe and the second at least a second setion of the probe is a tip of the air data probe. In exemplary embodiments, at least one of the at least one low temperature coefficient of resistance component and the at least one high temperature coefficient of resistance component is a heating element of the probe.

Method 500 proceeds to block 506 with providing at least one shunt component in parallel with the at least one high TCR component, wherein when the at least on high TCR component exceeds a set temperature point, the at least one shunt component is activated to reduce the current flowing through at least one high TCR component. In exemplary embodiments, the voltage seen across the high TCR component exceeds a set voltage point at the set temperature point. In exemplary embodiments, providing at least one shunt component further comprises providing at least one Zener diode. In exemplary embodiments, providing at least one shunt component further comprises providing at least one Schottky diode. In exemplary embodiments, providing at least one shunt component further comprises providing at least one thyristor. In exemplary embodiments, providing at least one shunt component further comprises providing at least one thermistor. In exemplary embodiments, the at least one thyristor includes at least one of a diode for alternating current (DIAC) and a triode for alternating current (TRIAC).

Example Embodiments

Example 1 includes a control circuit for a probe, the control circuit comprising: at least one low temperature coefficient of resistance component placed in at least a first section of a probe, wherein the at least one low temperature coefficient of resistance component has a low positive temperature resistance coefficient; at least one high temperature coefficient of resistance component placed in at least a second section of the probe and connected in series with the at least one low temperature coefficient of resistance component, wherein the at least one high temperature coefficient of resistance component has a high positive temperature resistance coefficient, and wherein the at least one high temperature coefficient of resistance component responds to temperature differently than the at least one low temperature coefficient of resistance component; and at least one shunt component connected in parallel with the at least one high temperature coefficient of resistance component, wherein when the temperature of the at least one high temperature coefficient of resistance component exceeds a set temperature point, the at least one shunt component is activated to reduce the current flowing through the at least one high temperature coefficient of resistance component.

Example 2 includes the control circuit of Example 1, wherein when the voltage seen across the at least one high temperature coefficient of resistance component exceeds a set voltage point, the at least one shunt component is activated to reduce the current flowing through at least one high temperature coefficient of resistance component.

Example 3 includes the control circuit of any of Examples 1-2, wherein the at least a first section of the probe is a strut of the probe and wherein the at least a second section of the probe is a tip of the probe.

Example 4 includes the control circuit of any of Examples 1-3, wherein at least one of the at least one low temperature coefficient of resistance component and the at least high temperature coefficient of resistance component is a heating element of the probe.

Example 5 includes the control circuit of any of Examples 1-4, wherein the at least one shunt component includes at least one of a thermistor and a thyristor.

Example 6 includes the control circuit of any of Examples 1-5, wherein the at least one shunt component includes at least one diode.

Example 7 includes the control circuit of Example 6, wherein the at least one shunt component includes at least one of a Zener diode and a Schottky diode.

Example 8 includes the control circuit of any of Examples 1-7, wherein the at least one shunt component includes at least one of a diode for alternating current (DIAC) and a triode for alternating current (TRIAC).

Example 9 includes the control circuit of any of Examples 1-8, further comprising a full wave rectification circuit to convert aircraft alternating current (AC) power to direct current (DC) power.

Example 10 includes the control circuit of any of Examples 1-9, wherein the at least one low temperature coefficient of resistance component includes nichrome.

Example 11 includes a method for manufacturing a power control circuit in an air data probe, the method comprising: providing at least one low temperature coefficient of resistance component in a heater cable of the probe in a first section of the probe; providing at least one high temperature coefficient of resistance component in the heater cable of the probe in a second section of the probe, wherein the at least one high temperature coefficient of resistance component is connected in series with the at least one low temperature coefficient of resistance component and wherein the at least one low temperature coefficient of resistance component responds to temperature differently than the at least one high temperature coefficient of resistance component; providing at least one shunt component connected in parallel with the at least one high temperature coefficient of resistance component, wherein when the temperature of the at least one high temperature coefficient of resistance component exceeds a set temperature point, the at least one shunt component is activated to reduce the current flowing through at least one high temperature coefficient of resistance component.

Example 12 includes the method of Example 11, wherein the at least the first section of probe is a strut of the air data probe and wherein the at least the second section of the probe is a tip of the probe.

Example 13 includes the method of any of Examples 11-12, wherein at least one of the at least one low temperature coefficient of resistance component and the at least one high temperature coefficient of resistance component is a heating element of the probe.

Example 14 includes the method of any of Examples 11-13, wherein providing at least one low temperature coefficient of resistance component further comprises fabricating the at least one low temperature coefficient of resistance component of a material composed of nichrome.

Example 15 includes the method of any of Examples 11-14, wherein providing at least one shunt component comprises providing at least one of a thermistor, a thyristor, a diode, a Zener diode, and a Schottky diode.

Example 16 includes the method of any of Examples 11-15, wherein providing at least one shunt component further comprises providing at least one of a diode for alternating current (DIAC) and a triode for alternating current (TRIAC).

Example 17 includes the method of any of Examples 11-16, further comprising converting alternating current (AC) power from a power supply to direct current (DC).

Example 18 includes a controlled probe circuit for a pitot or pitot static probe comprising: at least one strut heating element that has a low positive temperature resistance coefficient (PTC) placed along a strut of the probe; at least one tip heating element connected in series with the at least one strut heating element, wherein the at least one tip heating element is positioned in a tip of the probe and has a high positive temperature resistance coefficient (PTC); at least one shunt component including: a diode for alternating current (DIAC) having a set breakdown voltage, wherein the DIAC is connected to a capacitor, and wherein the DIAC conducts current when the charge accumulated by the capacitor is the same as the set breakdown voltage; and a triode for alternating current (TRIAC) having a gate connected to the diode for alternating current (DIAC) and a first terminal of the triode for alternating current (TRIAC) is connected to the capacitor, wherein the triode for alternating current (TRIAC) conducts current when the diode for alternating current (DIAC) conducts current and allows the capacitor to discharge into the gate of the triode for alternating current (TRIAC); wherein when the temperature of the at least one tip heating element exceeds a set temperature point, the at least one shunt component shunts current flowing through the at least one tip heating element; and wherein the temperature of the at least one tip heating element exceeds a set temperature point when the voltage seen across the at least one tip heating element exceeds the breakdown voltage.

Example 19 includes the controlled probe circuit of Example 18, further comprising: a first resistor connected to the diode for alternating current (DIAC), wherein the first resistor controls the amount of phase shift on the gate of the triode for alternating current (TRIAC); an operational amplifier (op-amp) connected to the first resistor at the output such that the current output from the op-amp flows through the first resistor; and a second resistor connected to a second terminal of the triode for alternating current (TRIAC).

Example 20 includes the controlled probe circuit of Example 19, further comprising: a third resistor connected in series with the at least one strut heating element; a fourth resistor connected in series with the third resistor; and wherein the output of the op-amp is dependent on output of the op-amp in a previous state and on current after flowing through the third resistor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A control circuit for a probe, the control circuit comprising:

at least one low temperature coefficient of resistance component placed in at least a first section of a probe, wherein the at least one low temperature coefficient of resistance component has a low positive temperature resistance coefficient;

at least one high temperature coefficient of resistance component placed in at least a second section of the probe and connected in series with the at least one low temperature coefficient of resistance component, wherein the at least one high temperature coefficient of resistance component has a high positive temperature resistance coefficient, and wherein the at least one high temperature coefficient of resistance component responds to temperature differently than the at least one low temperature coefficient of resistance component; and at least one shunt component connected in parallel with the at least one high temperature coefficient of resistance component, wherein when the temperature of the at least one high temperature coefficient of resistance component exceeds a set temperature point, the at least one shunt component is activated to reduce the current flowing through the at least one high temperature coefficient of resistance component.

2. The control circuit of claim 1, wherein when the voltage seen across the at least one high temperature coefficient of resistance component exceeds a set voltage point, the at least one shunt component is activated to reduce the current flowing through at least one high temperature coefficient of resistance component.

3. The control circuit of claim 1, wherein the at least a first section of the probe is a strut of the probe and wherein the at least a second section of the probe is a tip of the probe.

4. The control circuit of claim 1, wherein at least one of the at least one low temperature coefficient of resistance component and the at least high temperature coefficient of resistance component is a heating element of the probe.

5. The control circuit of claim 1, wherein the at least one shunt component includes at least one of a thermistor and a thyristor.

6. The control circuit of claim 1, wherein the at least one shunt component includes at least one diode.

7. The control circuit of claim 6, wherein the at least one shunt component includes at least one of a Zener diode and a Schottky diode.

8. The control circuit of claim 1, wherein the at least one shunt component includes at least one of a diode for alternating current (DIAC) and a triode for alternating current (TRIAC).

9. The control circuit of claim 1, further comprising a full wave rectification circuit to convert aircraft alternating current (AC) power to direct current (DC) power.

10. The control circuit of claim 1, wherein the at least one low temperature coefficient of resistance component includes nichrome.

11. A method for manufacturing a power control circuit in an air data probe, the method comprising:

providing at least one low temperature coefficient of resistance component in a heater cable of the probe in a first section of the probe;

providing at least one high temperature coefficient of resistance component in the heater cable of the probe in a second section of the probe, wherein the at least one high temperature coefficient of resistance component is connected in series with the at least one low temperature coefficient of resistance component and wherein the at least one low temperature coefficient of resistance component responds to temperature differently than the at least one high temperature coefficient of resistance component;

providing at least one shunt component connected in parallel with the at least one high temperature coefficient of resistance component, wherein when the temperature of the at least one high temperature coefficient of resistance component exceeds a set temperature point, the at least one shunt component is activated to reduce the current flowing through at least one high temperature coefficient of resistance component.

12. The method of claim 11, wherein the at least the first section of the probe is a strut of the probe and wherein the at least the second section of the probe is a tip of the probe.

13. The method of claim 11, wherein at least one of the at least one low temperature coefficient of resistance component and the at least one high temperature coefficient of resistance component is a heating element of the probe.

14. The method of claim 11, wherein providing at least one low temperature coefficient of resistance component further comprises fabricating the at least one low temperature coefficient of resistance component of a material composed of nichrome.

15. The method of claim 11, wherein providing at least one shunt component comprises providing at least one of a thermistor, a thyristor, a diode, a Zener diode, and a Schottky diode.

16. The method of claim 11, wherein providing at least one shunt component further comprises providing at least one of a diode for alternating current (DIAC) and a triode for alternating current (TRIAC).

17. The method of claim 11, further comprising converting alternating current (AC) power from a power supply to direct current (DC).

18. A controlled probe circuit for a pitot or pitot static probe comprising:
at least one strut heating element that has a low positive temperature resistance coefficient (PTC) placed along a strut of the probe;
at least one tip heating element connected in series with the at least one strut heating element, wherein the at least one tip heating element is positioned in a tip of the probe and has a high positive temperature resistance coefficient (PTC);
at least one shunt component including:
a diode for alternating current (DIAC) having a set breakdown voltage, wherein the DIAC is connected to a capacitor, and wherein the DIAC conducts current when the charge accumulated by the capacitor is the same as the set breakdown voltage; and
a triode for alternating current (TRIAC) having a gate connected to the diode for alternating current (DIAC) and a first terminal of the triode for alternating current (TRIAC) is connected to the capacitor, wherein the triode for alternating current (TRIAC) conducts current when the diode for alternating current (DIAC) conducts current and allows the capacitor to discharge into the gate of the triode for alternating current (TRIAC);
wherein when the temperature of the at least one tip heating element exceeds a set temperature point, the at least one shunt component shunts current flowing through the at least one tip heating element; and
wherein the temperature of the at least one tip heating element exceeds a set temperature point when the voltage seen across the at least one tip heating element exceeds the breakdown voltage.

19. The controlled probe circuit of claim 18, further comprising:
a first resistor connected to the diode for alternating current (DIAC), wherein the first resistor controls the amount of phase shift on the gate of the triode for alternating current (TRIAC);
an operational amplifier (op-amp) connected to the first resistor at the output such that the current output from the op-amp flows through the first resistor; and
a second resistor connected to a second terminal of the triode for alternating current (TRIAC).

20. The controlled probe circuit of claim 19, further comprising:
a third resistor connected in series with the at least one strut heating element;
a fourth resistor connected in series with the third resistor; and
wherein the output of the op-amp is dependent on output of the op-amp in a previous state and on current after flowing through the third resistor.

* * * * *